(12) United States Patent
Charopoulos (10) Patent No.: US 11,497,355 B2
(45) Date of Patent: Nov. 15, 2022

(54) FOOD PREPARATION APPLIANCE WITH DETACHABLE TOOL

(71) Applicant: Vorwerk & Co. Interholding GmbH, Wuppertal (DE)

(72) Inventor: Philipp Charopoulos, Düsseldorf (DE)

(73) Assignee: Vorwerk & Co. Interholding GmbH

( * ) Notice: Subject to any disclaimer, the term of this patent is extended or adjusted under 35 U.S.C. 154(b) by 809 days.

(21) Appl. No.: 16/410,653

(22) Filed: May 13, 2019

(65) Prior Publication Data

US 2019/0343335 A1    Nov. 14, 2019

(30) Foreign Application Priority Data

May 14, 2018 (EP) .................................... 18171974

(51) Int. Cl.
*A47J 43/07* (2006.01)
*A47J 43/046* (2006.01)

(52) U.S. Cl.
CPC ......... *A47J 43/0722* (2013.01); *A47J 43/046* (2013.01)

(58) Field of Classification Search
CPC ... A47J 43/046; A47J 43/0465; A47J 43/0722
USPC .................................................. 241/92, 282.1
See application file for complete search history.

(56) References Cited

U.S. PATENT DOCUMENTS 3,355,152 A    11/1967 Otto
4,700,903 A *  10/1987 Henn .................. A47J 43/0772
                                                 241/37.5
4,817,878 A *   4/1989 Shibata ................ A47J 43/046
                                                   403/349
6,715,706 B1    4/2004 Planca et al.
7,419,111 B2 *  9/2008 Gursel ................ A47J 43/0722
                                                  241/292.1
2006/0169812 A1* 8/2006 Galban ............... A47J 43/0722
                                                  241/282.1
2016/0198902 A1  7/2016 Giraud et al.
2019/0045976 A1* 2/2019 Ouyang .................. B01F 27/84
                                                   241/37.5
2019/0255494 A1* 8/2019 Charopoulos ......... A23N 12/02
                                                   241/37.5

FOREIGN PATENT DOCUMENTS

CN    107713823 A      2/2018
EP    0100755 A2 *     2/1984  .............. B26D 3/22
EP    0157128 A1      10/1985

* cited by examiner

*Primary Examiner* — Adam J Eiseman
*Assistant Examiner* — Matthew Stephens
(74) *Attorney, Agent, or Firm* — Barnes & Thornburg LLP (57) ABSTRACT

The present disclosure relates to food preparation appliance with a rotatable tool for chopping and/or mixing a food in a food preparation container, the tool being detachably connected to a shaft, which extends from outside the food preparation container through a passage toward the tool inside the food preparation container in order to be able to drive the tool to rotate. A locking mechanism is provided for producing a locked connection of the tool to the shaft and is equipped so that a releasing and/or a locking of the connection of the tool from/to the shaft can be performed from outside the food preparation container. The present disclosure also relates to an anchoring assembly for the food preparation appliance. It is thus possible to ensure a simple and convenient removal of a prepared food from the food preparation container.

10 Claims, 4 Drawing Sheets

FOOD PREPARATION APPLIANCE WITH DETACHABLE TOOL

FIELD OF THE DISCLOSURE

The present disclosure relates to a food preparation appliance with a rotatable tool for chopping and/or mixing a food in a food preparation container. The tool can be detachably connected to a shaft, which extends from outside the food preparation container through a passage toward the inside the food preparation container in order to be able to drive the tool. A locking mechanism for producing a locked connection of the tool to the shaft is provided. The present disclosure also relates to an anchoring assembly for the food preparation appliance.

BACKGROUND

In food preparation appliances such as food processors, a mixing blade unit is often integrated as a tool into a passage in the bottom of the bowl. When a food is being removed, though, the mixing blade can get in the way and the mixing blade can also injure the user. Some food preparation appliances permit the mixing blade unit to be removed from the passage, but this can cause the bowl to leak.

SUMMARY

The object of the present disclosure is to provide a modified food preparation appliance.

The object of the present disclosure is attained by a food preparation appliance including, in general, an anchoring assembly for the food preparation appliance. Advantageous embodiments with additional features are also described and shown through this document.

The object of the present disclosure may more specifically be attained by a food preparation appliance with a rotatable tool for chopping and/or mixing a food in a food preparation container. The tool can be detachably connected to a shaft. The shaft extends from outside the food preparation container through a passage toward the tool inside the food preparation container in order to be able to drive the tool. When the tool is driven by the shaft, this causes the tool to rotate. A locking mechanism for producing a locked connection of the tool to the shaft is provided. The locking mechanism is equipped so that a releasing and/or locking of the connection of the tool to the shaft can be performed from outside the food preparation container.

After the preparation of a food, a user can thus detach the tool from the outside, without having to come into direct contact with the prepared food in order to do so. The detached tool can then be removed from the food preparation container, for example with a fork or the like. The prepared food can then be removed from the food preparation container without being hindered by the tool. Among other things, this achieves the advantage of being able to quickly and thoroughly clean the inside of the bowl and the tool by hand in a particularly trouble-free way in preparation for a subsequent use, without having to disassemble the container and tool into multiple parts in order to do so.

Another aspect of the present disclosure relates to the attainment of the object of providing an anchoring assembly for the above-described food preparation appliance. The anchoring assembly is provided to achieve the anchoring in a food preparation container of the food preparation appliance, specifically in such a way that a shaft of the anchoring assembly can extend from outside the food preparation container through a passage that leads into the inside of the food preparation container. The shaft can then drive, i.e. rotate, a tool inside the food preparation container for a mixing and/or chopping of a food. The anchoring assembly includes an anchoring element and an anchoring device for anchoring the anchoring element to a food preparation container. The anchoring device is positioned in the direction of an axis of rotation of the shaft between an actuating element and a locking element, with the actuating element and the locking element being coupled to each other so that the actuating element and the locking element are able to move together relative to the anchoring element. A prepared food can thus be removed from a food preparation container without being hindered by a tool for mixing and/or chopping. An anchoring assembly for a food preparation appliance can seal a passage in a container bottom of the food preparation container in the anchored state and by means of the shaft, can drive the tool for the chopping and/or mixing. In particular, an anchoring produces a sealed, rotationally coupled, and/or axial fixing. The shaft can in turn be driven at the other end by a drive unit. The following description relates equally to the above-described food preparation appliance for attaining the object and to the anchoring assembly for the food preparation appliance.

The tool has an axis of rotation. In the operational state, the tool is connected to the shaft in a rotationally coupled manner, particularly by means of form-fitting engagement. The locking is In some embodiments an axial locking. An axial locking between the tool and shaft can lock in such a way that the tool is prevented from disengaging from the shaft due to an axial relative movement of the two away from each other. The tool can be composed of multiple parts. For example, the tool can comprise at least one mixing tool, which is firmly affixed to a coupling shaft. The coupling shaft in turn can be connected to the shaft in a rotationally coupled manner, particularly by means of a form-fitting engagement. In some embodiments, the mixing tool is a radially protruding blade for chopping and mixing. In some embodiments, the tool has at least two or four mixing tools positioned so that they are offset from one another around the axis of rotation. In order to chop and/or mix a food, the tool is positioned inside the food preparation container and can be rotated therein driven by the shaft. In particular, the tool is a component of a tool assembly.

A shaft is a cylindrical rotating body. The shaft and the tool In some embodiments have the same axis of rotation. A shaft can have one or more shaft shoulders, for example for a ball bearing seat or serving as a shield. A shaft, which extends from outside the food preparation container through a passage toward the tool inside the food preparation container, can transmit a driving torque from a drive motor outside the food preparation container to the tool inside the food preparation container. The passage leads from the outside of the food preparation container to the inside. In particular, the passage is formed by a closed circumferential wall in the container bottom. The passage In some embodiments extends axially and/or coaxially to the axis of rotation. In particular, a sealing element is provided in the region of the container passage so that in the operational state or at least when the anchoring assembly is anchored at the bottom, no liquid can travel from the inside of the food preparation container to the outside. In one embodiment, the food preparation container and/or the tool contain(s) metal. In some embodiments, the mixing tool contains metal or consists entirely of metal.

In general, the inside of the food preparation container includes the entire contiguous space, which, in the operational state, is filled with a liquid, for example, when the operational food preparation container is filled with a liquid. The expression "inside of a food preparation container" is understood to mean this space. The lower boundary of this space, which, in the operational state, is basically comprised partially of the anchoring assembly, does not have to be flat and can, for example, comprise a cup-shaped recess or extend in a step shape. Deviations from a flat shape, however, are not preferred in the present case if, as in the case of a cup-shaped recess, this would unduly complicate a removal of a food and cleaning.

When the tool is connected to the shaft in a rotationally coupled manner, e.g. by a placement of the tool onto the shaft and a rotationally coupled mutual engagement of corresponding, non-rotationally symmetrical connecting contours, then this connection has not yet been locked. In other words, in addition to this rotational coupling, there is another movable mechanism that can produce the locking. The movable mechanism, through a movement of a component of the movable mechanism, can be brought into an unlocked position and into a locked position.

In the locked position, the tool cannot be disengaged and removed from the shaft. In the unlocked position, the tool can be disengaged and removed from the shaft, In some embodiments in the axial direction. The movable mechanism is therefore referred to as the locking mechanism.

The tool is In some embodiments part of an assembly that is referred to as the tool assembly. The shaft is advantageously part of an assembly that is referred to as the anchoring assembly. It is thus possible to simplify the operation. An "assembly" is understood to mean a unit that consists of multiple individual parts. Combining a plurality of components into a coherent assembly makes it possible to simplify the operation. The parts of the assembly can be connected to one another through form-fitting, nonpositive, and/or integral engagement. The two assemblies, i.e. the tool assembly and the anchoring assembly, particularly comprise parts that make it possible to connect the shaft and the tool to each other in a rotationally coupled way. The two assemblies especially comprise parts that enable the locking of the shaft and tool.

In some embodiments, the tool assembly comprises a rotary bearing for the tool. This rotary bearing enables a rotation of the tool relative to one or more other parts of the tool assembly, particularly relative to a tool connecting element.

By means of the rotary bearing for the tool, the tool is fixed relative to the one or more other components, preferably in the axial direction. In other words, the tool and the one or more other components of the tool assembly are then unable to execute a relative movement in the axial direction.

In some embodiments, the anchoring assembly includes a rotary bearing for the shaft. The rotary bearing for the shaft permits the shaft to rotate relative to one or more other parts of the anchoring assembly.

By means of the rotary bearing for the shaft, the shaft is fixed relative to the one or more other components, preferably in the axial direction. In other words, the shaft and the one or more other components of the anchoring assembly are then unable to execute a relative movement in the axial direction.

The rotary bearing for the tool is preferably a ball bearing. The rotary bearing for the shaft is preferably a ball bearing. In one embodiment, the tool assembly comprises another shaft, which is referred to as the coupling shaft. The tool is connected to the coupling shaft, preferably in a non-detachable, axial, and rotationally coupled fashion. The tool and the coupling shaft are then unable to move relative to each other. The tool and coupling shaft also cannot be non-destructively separated from each other.

If the tool assembly and anchoring assembly are connected to each other in a rotationally coupled fashion and locked, then the shaft of the anchoring assembly and the coupling shaft are connected to each other in a rotationally coupled fashion, preferably by means of form-fitting engagement in order to be able to separate the shaft of the anchoring assembly and the coupling shaft again in a particularly simple way. The shaft of the anchoring assembly and the coupling shaft can be rotated together relative to other parts of the two assemblies, particularly relative to the anchoring element and/or the tool connecting element.

In one embodiment, the locking mechanism and in particular the anchoring assembly comprises a locking element and an actuating element. Starting from the unlocked position, the tool and shaft in the connected state can be locked to each other by means of the locking element. Starting from the locked position, the tool and shaft can be unlocked by means of the locking element. The locking element and the actuating element are coupled to each other. Because of the coupling, the locking element can be moved into its locking position and into its non-locking position by an actuation of the actuating element. The non-locking position is also referred to as the unlocked position or release position. The locked position is also referred to as the locking position. A movement such as a rotation and/or translation of the actuating element thus produces an in particular synchronous movement of the locking element and/or vice versa. The actuating element for actuating the locking mechanism is situated outside the food preparation container and/or below an anchoring device of the anchoring assembly. The locking element for the locked connection of the tool to the shaft is situated inside the food preparation container and/or above an anchoring device of the anchoring assembly. the indications "outside" and "inside" refer to an operational state of the food preparation appliance. A releasing and/or locking of the connection of the tool from/to the shaft from outside the food preparation container can therefore be implemented in a particularly simple and compact way.

The actuating element and/or the locking element are preferably disc-like. The actuating element and/or the locking element preferably have at least one projection. If the actuating element and the locking element are supported so that they are able to rotate around an axis, then such a projection particularly extends in the radial direction, viewed from the axis. Alternatively or in addition, the actuating element and/or the locking element are/is embodied as lever-like.

In one embodiment, the coupling of the actuating element to the locking element is performed by means of a connecting means that extends inside the passage and/or axially. The term "axially" is understood to mean in the direction of the axis of rotation and unless otherwise indicated, the "axis of rotation" always refers to the axis of rotation of the tool. It is thus possible to achieve a particularly compact design. A coupling can be achieved by means of a movement-coupled connection of the connecting means to the actuating element and the locking element. Because of this coupling, the locking element then executes the same movements as the actuating element. Alternatively, it is basically possible for the connecting means to be a driving element such that only certain movements and/or only movements within a certain range are transmitted by the actuating element to the locking element via the connecting means. In general, a coupling can transmit a rotary motion, a torque, a linear movement, and/or a linear force or prestressing force.

In one embodiment, the connecting means extends in a recess of the anchoring element. This recess is referred to as the connecting recess. The anchoring element then separates the connecting means from the wall of the passage in the radial direction. In some embodiments, the connecting recess for the connecting means extends not only axially, but also in the circumference direction so that when the actuating element rotates, the connecting means does not block the rotation relative to the anchoring element.

In one embodiment, viewed in a longitudinal section along an axis of rotation, the actuating element forms an L shape with the connecting means. In one embodiment, viewed in the longitudinal section along an axis of rotation, the connecting means forms an L shape with the locking element. The actuating element, the connecting means, and the locking element in this sequence together preferably form a U shape, which is preferably tilted 90° relative to the axis of rotation. The expression "in this sequence" means that the three components mentioned respectively constitute the three legs of the U shape that are connected perpendicularly one after another. The "axis of rotation" refers to the axis of rotation of the tool. An L shape makes it possible, in an actuation of the locking mechanism—e.g. by rotating it around the axis of rotation, to benefit from a lever action and thus to reduce the actuation force required. A U shape in turn enables a particularly rugged coupling, not only for a rotating motion, but also for an axial movement and/or an axial prestressing. Because of the U shape, the locking element can, for example, be pressed or held down in a prestressed way against a detent contour in that a compressive force or prestressing force is exerted on the actuating element in the same direction. In other words, the U shape makes it possible in a very compact and rugged way to introduce a force or movement outside the food preparation container, which can then produce the locking and/or releasing action inside the food preparation container by means of the locking element.

The L shape and/or the U shape, viewed in the longitudinal section, can relate to only one side of the axis of rotation so that it is basically also possible to have an L-shaped or U-shaped lever that is particularly supported so that it is able to pivot around the axis of rotation. But viewed in the longitudinal section, a disc-like body can also form an L shape with a lever or cylindrical body adjoining it at a right angle. In one embodiment, the actuating element and/or the locking element are disc-shaped. In one embodiment, the connecting means is a preferably straight connector piece. Preferably, the connecting means is integrally connected to the actuating element and/or the locking element. In particular, a connector piece that is integrally joined to the locking element and serves as the connecting means is mounted to the actuating element at its other end in a fixed, i.e. non-movable, way and preferably, cannot be non-destructively detached from it. In one embodiment, there are at least two connecting means, preferably three connecting means, which in particular have the same shape and are positioned so that they are uniformly distributed around the axis of rotation.

In one embodiment, the actuating element and the locking element are in particular able to move jointly, preferably in an axially sliding and/or rotating fashion, relative to an anchoring element. The ability to move relative to the anchoring element enables an axial prestressing of the actuating element or locking element against the anchoring element, an axial stroke of the actuating element or locking element relative to the anchoring element, and/or simultaneously a rotary motion relative to the anchoring element. For example, it is thus possible to achieve a bayonet-like locking mechanism and/or a nonpositive securing of the locking element in a locking position.

In one embodiment, the anchoring element has an anchoring device for rotationally coupled and/or axially fixed anchoring to the food preparation container. The anchoring element can thus be connected in a sealed and/or fixed, i.e. immobile, fashion to the food preparation container or the wall of the passage in the container bottom of the food preparation container. It is thus possible to achieve a rugged support for a relative movement of the actuating element or locking element relative to the anchoring element and thus the food preparation container.

In one embodiment, the anchoring device includes a first non-rotationally symmetrical outer contour for a form-fitting, rotationally coupled connection to a non-rotationally symmetrical inner contour of the passage. In other words, the two non-rotationally symmetrical contours are adapted so that when the two contours engage with each other, a form-fitting, rotationally coupled connection is achieved. It is thus possible to obtain an easy-to-produce, rugged rotation prevention.

In one embodiment, the anchoring device comprises a slot-like opening for receiving an anchoring ring in an axial, form-fitting way. For the axial, form-fitting fixing of the anchoring element to the food preparation container, the anchoring ring can thus be brought into the slot-like opening in an extremely narrow space, preferably by means of a rotating movement around the axis of rotation, particularly in bayonet fashion. Preferably, the slot-like opening is accommodated in a radial projection of the first non-rotationally symmetrical outer contour of the anchoring element so that an anchoring ring that is adapted to the slot-like opening can be rotated into the slot-like opening of the first non-rotationally symmetrical outer contour of the anchoring element. In other words, the slot-like opening makes it possible that in the region or axial position of the slot-like opening, an anchoring ring—despite the otherwise non-rotationally symmetrical form [sic] of the first outer contour of the anchoring element—can nevertheless be rotated relative to it in order to travel into the slot-like opening.

In one embodiment, the anchoring ring has a non-rotationally symmetrical inner contour, which has a clearance fit relative to the first non-rotationally symmetrical outer contour of the anchoring element. To mount the anchoring ring in position, the anchoring ring can thus be slid from below over the first non-rotationally symmetrical outer contour, along the anchoring element, to the slot-like opening. In one embodiment, the at least one slot-like opening is adapted to the non-rotationally symmetrical inner contour of the anchoring ring in such a way that the anchoring ring can be rotated relative to the first non-rotationally symmetrical outer contour of the anchoring element into the slot-like opening of the first non-rotationally symmetrical outer contour of the anchoring element. The slot-like opening extends in the circumference direction and/or is embodied in the form of a shoulder or groove. In some embodiments, the at least one slot-like opening is positioned spaced apart from a stop in such a way that when the anchoring ring is rotated into the at least one slot-like opening, the anchoring ring is pressed against the wall, particularly of the container bottom, in such a way that the anchoring ring is elastically deformed. It is thus possible to achieve a prestressing and thus a particularly secure axial fixing.

In one embodiment, a wall, in particular a container bottom surrounding the passage, is fixed, braced, or clamped between a stop, in particular the bottom of the stop, and the anchoring ring when the anchoring ring has been moved or rotated into the at least one slot-like opening. The anchoring element can thus be axially fixed to the food preparation container in a particularly reliable way. In particular, the stop is part of the anchoring element and/or is integrally connected to the anchoring element. In some embodiments, the stop adjoins the first non-rotationally symmetrical outer contour of the anchoring element and/or at least partially has a larger diameter than a radial expansion of the first non-rotationally symmetrical outer contour of the anchoring element. In some embodiments, the stop is rotationally symmetrical, preferably disc-shaped.

In one embodiment, the locking mechanism is equipped so that through actuation of the actuating element, the locking element can be moved into a locking position for producing a locked connection between the tool and the shaft or into a release position for releasing a locked connection between the tool and the shaft. It is thus possible to achieve a reliable locking and releasing of the tool.

In one embodiment, a tool connecting element that is connected to the tool is provided for producing the locked connection between the tool and the shaft and/or the locking mechanism is equipped so that the locking element can engage in detent fashion with the tool connecting element, particularly in order to produce a connection that is fixed in an axial, form-fitting way. The tool can thus be locked to the shaft in a particularly reliable and user-friendly way by means of the tool connecting element. In particular, the tool is connected to the tool connecting element in an axially secured and/or rotatable way.

In one embodiment, the tool connecting element has a detent contour, which is in particular undercut and/or shoulder-shaped, for engaging in detent fashion with the locking element in the locking position. It is thus possible to achieve a reliable locking. In an alternative or additional embodiment, the detent contour is ramp-shaped, particularly in the circumference direction, preferably with an inclination angle of 5° to 30°. If the locking element is moved or rotated from the release position into the locking position, then the locking element slides onto the ramp-shaped detent contour in the axial direction. This increases the contact pressure of the locking element against the detent contour. It is thus possible to achieve a particularly reliable securing of the locking element in the locking position. In some embodiments, the detent contour is positioned inside a space that is enclosed by the tool connecting element, preferably in a bell-like fashion.

In one embodiment, a clamping means, in particular a spring, is provided and/or the locking mechanism is equipped so that the clamping means prestresses the locking element axially, particularly against the anchoring element. It is thus possible to achieve a particularly reliable securing of the locking element in the locking position. In particular, the clamping means is positioned on the radially protruding bottom of the first non-rotationally symmetrical outer contour, and presses directly against the top of the actuating element. In some embodiments, a receiving recess for the clamping means is provided in the actuating element, which recess preferably extends not only axially, but also in the circumference direction, so that when the actuating element rotates, the clamping means does not block the rotation relative to the anchoring element. In one embodiment, the clamping means is positioned at a radial distance from the axis of rotation that is smaller than the radius of the passage opening of the food preparation container.

In one embodiment, the anchoring element has a second non-rotationally symmetrical outer contour for fixing the tool connecting element in a form-fitting, rotationally coupled manner and/or the tool connecting element comprises a non-rotationally symmetrical inner contour, which is embodied and/or adapted to the second non-rotationally symmetrical outer contour in such a way that the tool connecting element can be slid onto the second non-rotationally symmetrical outer contour. It is thus possible to achieve a particularly reliable rotational fixing between the tool connecting element and the anchoring element and thus the food preparation container. In one embodiment, the stop is positioned axially, in particular directly, between the first non-rotationally symmetrical outer contour and the second non-rotationally symmetrical outer contour and/or has a larger diameter than the second outer contour.

In one embodiment, the locking mechanism is equipped so that for a locking of the connection of the tool to the shaft, the actuating element is rotated so that the locking element rotates from the release position into the locking position and in the course of this, due to the ramp-shaped detent contour, simultaneously slides axially in opposition to the prestressing force of the clamping means, i.e. slides relative to the anchoring element. The axial sliding makes it possible for the locking element to be brought into a particularly extensive overlap with the undercut detent contour in the locking position because the otherwise essentially inelastic locking element, connecting means, actuating element, and anchoring element would not offer a sufficiently elastic deformability for the upward sliding of the ramp-shaped detent contour. In particular, the ramp-shaped detent contour is supported by a preferably sealed contact of the bottom of the tool connecting element on the anchoring element, in particular the top of the stop. The prestressing force of the clamping element is thus transmitted to the top of the anchoring element inside the food preparation container and to the bottom of the first non-rotationally symmetrical outer contour of the anchoring element outside the food preparation container. In one embodiment, the prestressing force is not transmitted to the food preparation container.

In one embodiment, an actuation means, in particular a base part of the food preparation container, is provided for actuating the actuating element and/or the locking mechanism is equipped so that in order to lock the connection of the tool to the shaft, the actuation means can be rotated relative to the food preparation container into an operating position and/or in order to release the connection of the tool to the shaft, the actuation means can be rotated relative to the food preparation container out of the operating position. This therefore permits the user to execute a particularly smooth manual locking and releasing. If the actuation means is the base part, then this gives the base part a double function. In particular, in the operating position, the base part is connected to the food preparation container in an axially fixed way and/or after being rotated out of the operating position, is released from the food preparation container. In general, the base part of the food preparation container can be placed onto a surface and/or be received by a recess in the food preparation appliance for operation.

In one embodiment, the first non-rotationally symmetrical outer contour of the anchoring element, the second non-rotationally symmetrical outer contour of the anchoring element, the non-rotationally symmetrical outer contour of the locking element, optionally the non-rotationally symmetrical outer contour of a shaft interface, as well as the non-rotationally symmetrical inner contour of the tool connecting element, the non-rotationally symmetrical inner contour of the anchoring ring, the non-rotationally symmetrical inner contour of the passage, and/or a non-rotationally symmetrical inner contour of the actuation means implement at least of the following features. According to a first feature, the non-rotationally symmetrical inner contour or outer contour is star-shaped and/or has at least two and/or at most ten radial recesses or projections. According to a second feature, all of the radial recesses and projections are shaped the same. According to a third feature, the radial recesses and projections are positioned in a uniformly distributed fashion in the circumference direction so that in particular, an inner contour or outer contour is obtained, which can be reproduced in multiple angular positions. According to a fourth feature, the inner contour and outer contour are continuous and without edges. According to a fifth feature, an inner contour and an outer contour have corresponding contours, which permit them to be slid manually into each other. According to a sixth feature, all of the above-mentioned inner contours and outer contours have the same contour shape, but can have a different scale. According to a seventh feature, all of the above-mentioned outer contours and/or inner contours are congruent.

In one embodiment, the anchoring element, the actuating element, the connecting means, the locking element, and the shaft are components of the anchoring assembly. It is thus possible to reduce the number of separate units. In one embodiment, the tool connecting element and the tool are components of the tool assembly. The user thus needs to handle fewer parts.

Another aspect of the present disclosure relates to a method in which a base part is rotated relative to a food preparation container in order to release a chopping and/or mixing tool from a shaft, which can remain anchored in a sealed manner in the container bottom of the food preparation container. This achieves a high degree of user convenience.

Another aspect of the present disclosure relates to a method in which by a rotation of an anchoring ring, an anchoring element is axially affixed to a food preparation container in a form-fitting manner. This achieves a compact, user-friendly fixing.

Exemplary embodiments of the present disclosure will also be explained in greater detail below based on figures; the features below can be combined with the claimed subjects. The claimed scopes of protection are not limited to the exemplary embodiments.

DETAILED DESCRIPTION OF THE DRAWINGS

Figure 1:
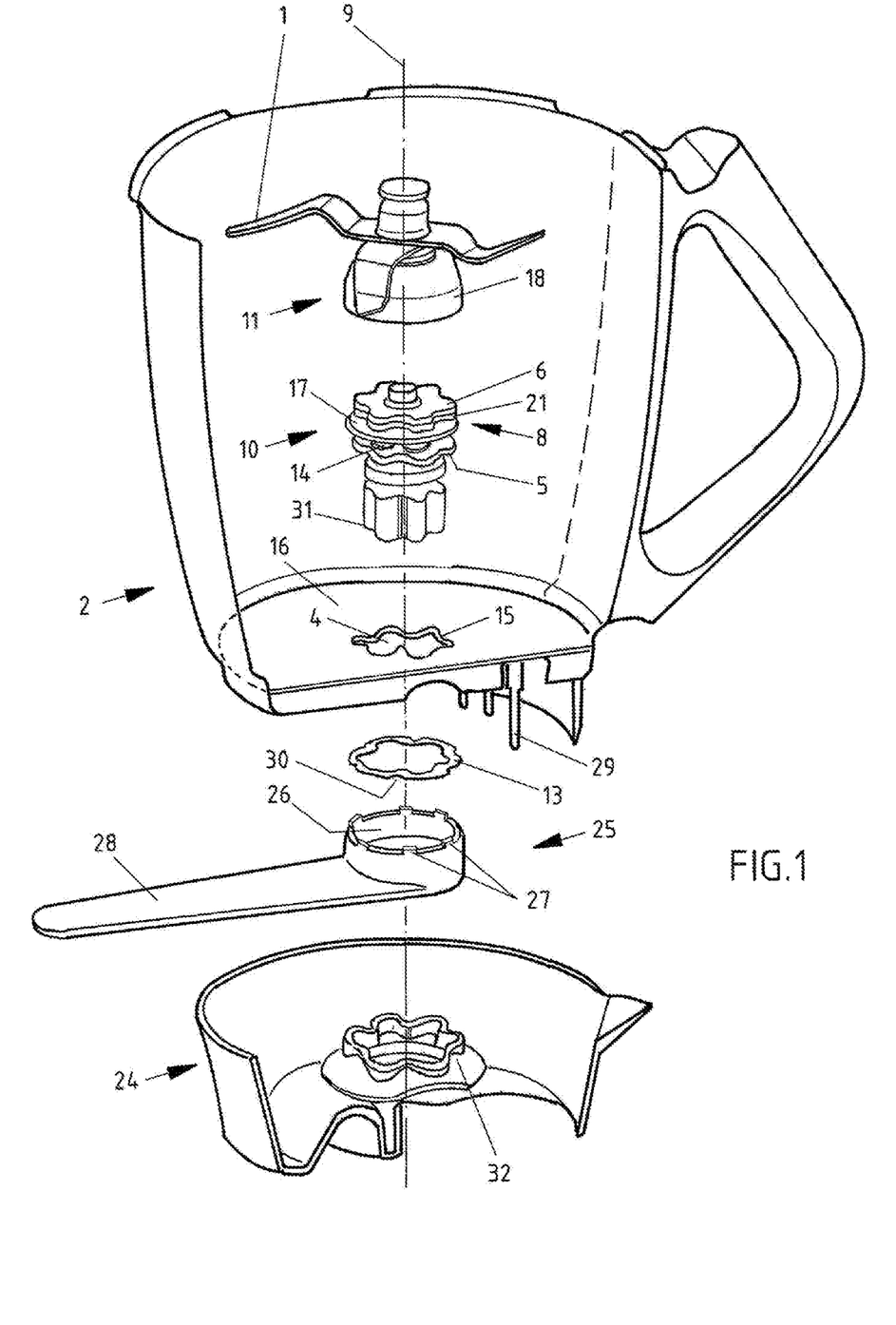
FIG. 1: is an exploded view of a part of a food preparation appliance.

FIG. 1 shows a food preparation container 2 and a tool assembly 11 with a tool connecting element 18 and tool 1 that can rotate around the axis of rotation 9 in order to chop and/or mix a food. The figure also shows an anchoring assembly 10, which is for producing the sealed anchoring in the passage 4 in the container bottom 16 and for transmitting a torque to the tool 1 from an electric drive, not shown, to which a coupling can be produced by means of a shaft interface 32. The anchoring assembly 10 comprises a locking element 6 and an actuating element 5 as well as an anchoring element 8, which, situated axially between the actuating element 5 and the locking element 6, has a first non-rotationally symmetrical outer contour 14, an in particular rotationally symmetrical stop 17, and a second non-rotationally symmetrical outer contour 21, preferably in exactly this sequence. The figure also shows an anchoring ring 13, which, with the aid of the separate rotating wrench 25, can be manually rotated in order to axially fix the anchoring assembly 10 to the container bottom 16 in the edge region of the passage 4. The rotation takes place relative to the anchoring element 8, which, by means of the first non-rotationally symmetrical outer contour 14, is fixed in a rotationally coupled fashion in the non-rotationally symmetrical inner contour 15 of the passage 4. The user can use an actuation means 24 embodied as a container bottom to actuate a locking mechanism for releasing and/or in particular axially locking the tool assembly 11 to the anchoring assembly 10. A non-rotationally symmetrical inner contour 32 of the actuation means 24 ensures a simple and reliable rotationally coupled attachment to the actuating element 5 from below.

The food preparation appliance is preferably a food preparation appliance such as an electric food processor, preferably with a heating element for heating the food in the food preparation container. During operation, a food and/or an ingredient is placed in the food preparation container 2 and is prepared there by mixing, chopping, and/or heating. A food can be solid or liquid. Plug contacts 29 are provided in order to supply electrical energy to an electrical component of the food preparation container 2, e.g. the heating element.

In one embodiment, the rotating wrench 25 is the shape of an open cylinder with an opening 26, that can be slid axially over the actuating element 5 and/or the first outer contour 14 in order to be able—even when the anchoring assembly 10 is axially fixed—to release the anchoring ring 13 by rotating it. In some embodiments, the rotating wrench 25 has a radial lever-like handle 28 for the user. In some embodiments, the cylinder shape is provided with a magnet for holding the anchoring ring 13 and/or axial projections 27 are provided, which can be brought into a rotationally coupled engagement in correspondingly shaped notches 30 in the outer contour of the anchoring ring 13 by being placed onto them in an axial fashion.

Figure 2:
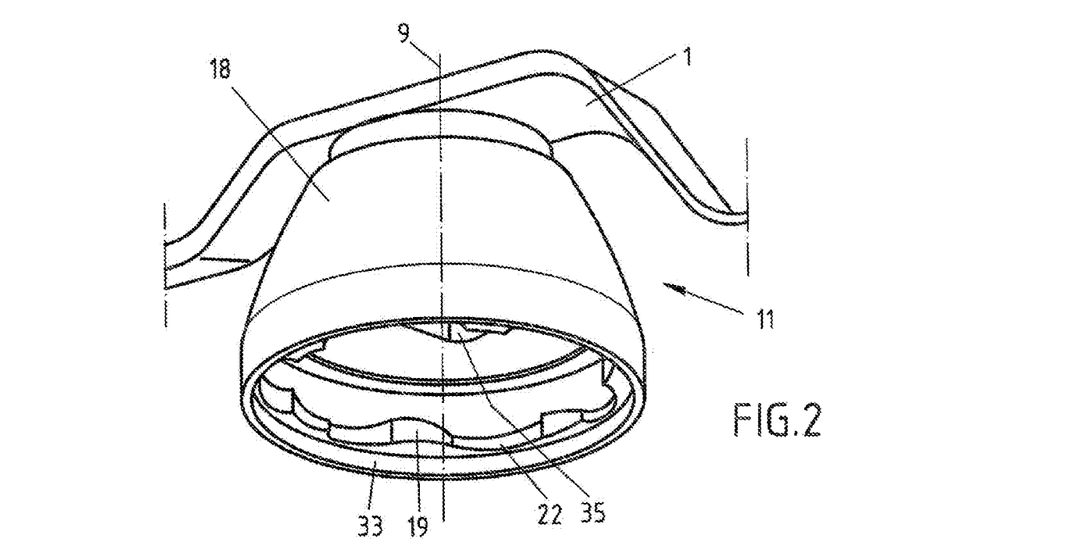
FIG. 2: is a schematic depiction of a tool assembly.

FIG. 2 shows the tool assembly 11 with the tool 1 and the bell-like or cup-shaped tool connecting element 18. At the opposite side from the tool 1, the tool connecting element 18 has a preferably rotationally symmetrical edge 33, particularly with a bevel of approximately 45°. The edge 33 forms an entrance to the inside of the space that is enclosed by the tool connecting element 18. This axial entrance is delimited and partially narrowed by the non-rotationally symmetrical inner contour 22 from the circumference in the direction toward the axis of rotation. The projections of the non-rotationally symmetrical inner contour 22 protruding inward toward the axis of rotation 9 simultaneously constitute the detent contours 19 for the locking element 6. The detent contours 19 thus narrow the entrance. The detent contours 19 extend in a ramp shape in the circumference direction, i.e.

the axial expansion becomes larger in the circumference direction. The non-rotationally symmetrical inner contour 22 and thus the detent contours 19 are adjoined by an undercut. At the closed upper end of the enclosed space is the non-rotationally symmetrical connecting contour 35 for connecting the tool 1 in a rotationally coupled manner. The non-rotationally symmetrical connecting contour 35 can be a component of the coupling shaft 42 shown in FIG. 6, which is preferably connected to the tool 1 in a non-detachable way.

Figure 3:
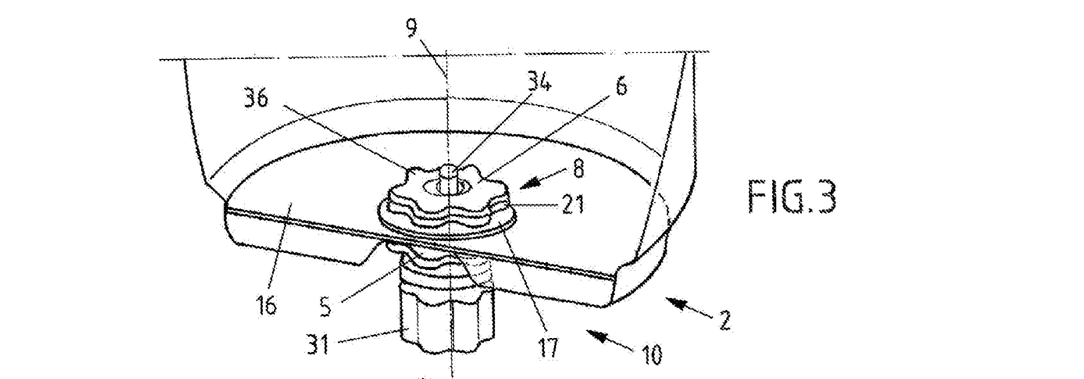
FIG. 3: is a schematic depiction of the release position of the locking element.
Figure 4:
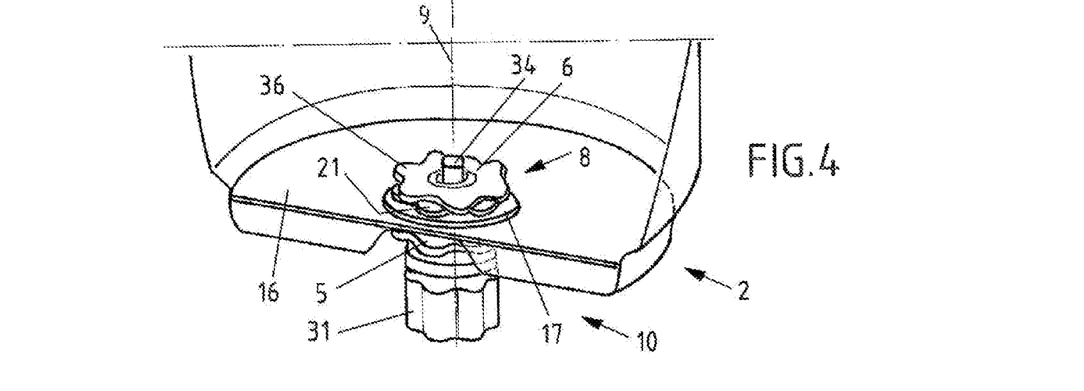
FIG. 4: is a schematic depiction of the locking position of the locking element.
Figure 5:
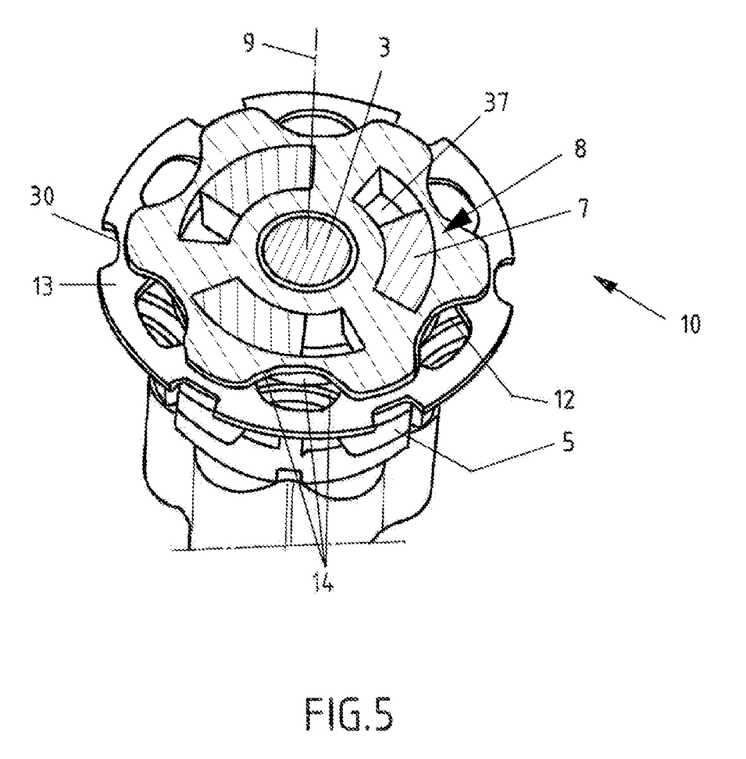
FIG. 5: shows cross-section through the anchoring assembly.
Figure 6:
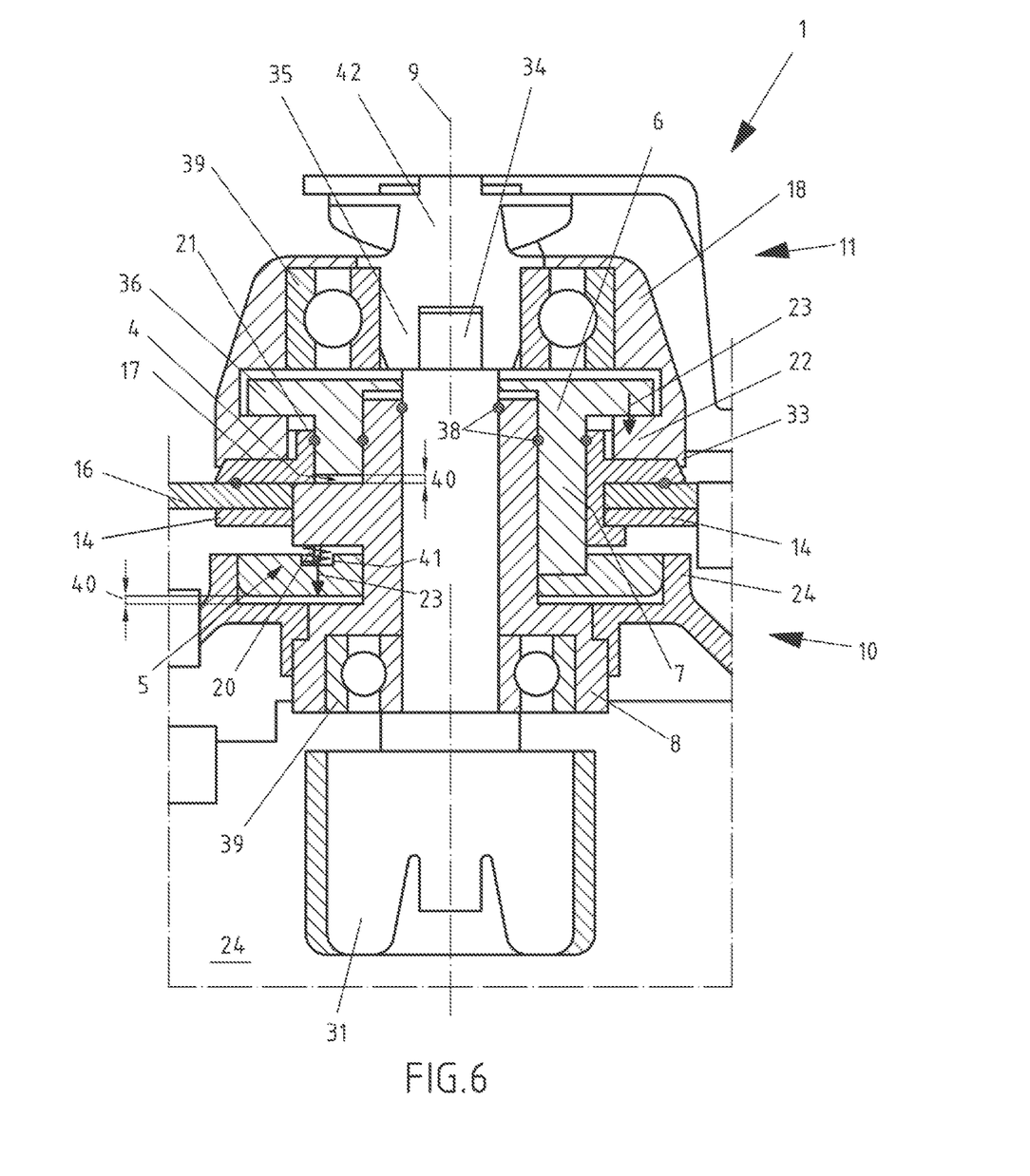
FIG. 6: shows a longitudinal section through the food preparation container with a tool that is connected in a locked fashion.

FIGS. 3 and 4 show the anchoring assembly 10 in a state in which it is anchored to the food preparation container 2. If the locking element 6 is in the release position as shown in FIG. 3 and the connecting contours 34, 35 are oriented properly to one another, then the tool assembly 11 can be slid onto the anchoring assembly 10 until the edge 33 is placed onto the preferably rotationally symmetrical stop 17, particularly in a flush or aligned orientation. The tool connecting element 18 then encloses the part of the anchoring assembly 10 above the stop 17, i.e. the second outer contour 21 and the locking element 6. When the edge 33 is resting on the stop 17, then at the same time, the non-rotationally symmetrical, mutually corresponding connecting contours 34, 35 of the tool 1 and the shaft 3 engage with one another, as shown in FIGS. 5 and 6, in order to produce a form-fitting, rotationally coupled connection for transmitting a driving torque of the drive, particularly by a connection by means of a round connection contour with two (parallel and opposed) flat sides. If the edge 33 rests on the stop 17, then the non-rotationally symmetrical inner contour 22 also simultaneously engages in the non-rotationally symmetrical outer contour 21 of the anchoring element 8 in order to connect the tool connecting element 18 to the anchoring element 8 in a rotationally coupled fashion. In the release position, the locking element 6 is oriented so that the non-rotationally symmetrical inner contour 22 can be slid over the locking element 6 and then can also pass unhindered over the second non-rotationally symmetrical outer contour 21 until it reaches the stop 17. In some embodiments, the locking element 6 overlaps the second outer contour 21 completely or is largely flush with it.

FIG. 4 shows the locking element 6 in the locking position, in which the locking element 6 is rotated around the axis of rotation 9 relative to the second non-rotationally symmetrical outer contour 21. In the locking position, the locking element 6 is no longer flush with the second outer contour 21 and also no longer overlaps the second outer contour 21 completely. If in the locking position, an attempt is made to slide the tool assembly 11 onto the anchoring assembly 10, then the edge 33 comes into contact with the top surface of the second outer contour 21 prematurely and therefore cannot reach the stop 17. This prevents an improper use.

If the tool connecting element 18 is properly slid onto the anchoring assembly 10 until it reaches the stop 17, then by manually rotating the actuation means 24 shown in FIG. 1, the actuating element 5 and thus the locking element 6 can be rotated into the locking position relative to the rotationally fixed second non-rotationally symmetrical outer contour 21. The radial projections 36 of the non-rotationally symmetrical outer contour of the locking element 6 are thus slid in the circumference direction onto the ramp-shaped detent contours 19 and are secured there in a wedged or prestressed manner. The locking can be released again by rotating in the opposite direction into the release position.

FIG. 5 shows a cross-section through the anchoring assembly 10, approximately at the height of the surface of the container bottom 16. The exactly three connecting means 7, which connect the actuating element 5 to the locking element 6 in a U shape in order to produce the axial and rotary coupling, are each guided axially through the anchoring element 8 via a connecting recess 37 provided for this purpose. In one embodiment, the connecting means 7 has the cross-sectional shape of an annular segment in order to be able be slid in the circumference direction in a particularly reliable way in a likewise annular segment-shaped connecting recess 37, which, compared to the connecting means, extends over a larger angular range so that the locking element can be rotated back and forth between the release position and the locking position. In FIG. 4, the anchoring ring 13 is rotated into the slot-like openings 12, preferably by means of the rotating wrench 25 shown in FIG. 1, which engages in the notches 30. The shaft 3 extends through a central bore in the anchoring element 8.

FIG. 6 shows a longitudinal section through the food preparation container with a connected tool in the locked state. At least one sealing element 38 such as a sealing ring is positioned between the bottom of the stop 17 and the top surface of the container bottom 16, between the connecting means 7 and at least one of the two radial inner walls of the connecting recess 37, and/or between the shaft 3 and the adjacent bore wall in the anchoring element 8, preferably at the upper end of the bore, in order to seal the food preparation container 2 at the bottom so that even liquid food cannot leak out from the container bottom 16 through the passage 4 and the anchoring assembly 10 that is anchored therein. FIG. 6 shows the ball bearings 39, which connect the tool 1 to the tool connecting element 18 and the shaft 3 with the anchoring element 8 in a rotating and axially fixed way. The figure also shows that the tool 1 can be designed so that it is composed of two parts and can have a coupling shaft 42 at the bottom, which then has the non-rotationally symmetrical connecting contour 35 of the tool and is supported in the tool connecting element 18 in rotary fashion by means of a ball bearing 39.

At least one clamping means 20, in particular a spring, is positioned and prestressed axially between the bottom of the first outer contour 14 and the top of the actuating element 5. In particular, at least two and/at most six clamping means 20, preferably three of them, are accommodated, preferably each in a respective receiving recess 41 in the actuating element 5, which recess preferably extends not only axially, but also particularly in the form of a circular segment in the circumference direction so that the clamping means 20 does not block the rotation of the actuating element 5 relative to the anchoring element 8 for producing a rotation of the locking element 6 between the locking position and the release position.

The prestressing force 23 of the clamping means 20 is transmitted to the locking element 6 by the connecting means 7 and is thus able to clamp the locking element 6 in the locking position against the detent contour 19. With the rotation of the locking element 6 from the release position into the locking position, the clamping means 20 is axially deflected by the ramp-shaped detent contour 19. The deflection corresponds to the stroke 40 produced by the sliding of the projection 36 of the locking element 6 onto the ramp-shaped detent contour 19. The U shape, which is formed by the actuating element 5, the connecting means 7, and the locking element 6, ensures a reliable transmission of the axial movement by means of the stroke 40 in opposition to the prestressing force 23 of the clamping means 20.

If the user has properly slid the tool assembly 11 onto the anchoring assembly 10—with the locking element 6 in the release position—until it has reached the stop 17, then the tool 1 comes to rest on the shaft 3 and the non-rotationally symmetrical connecting contours 34, 35 engage with each other. An axial locking of this connection of the tool 1 to the shaft 3 does not yet then exist, however, so that the tool assembly 11 would be released from the anchoring assembly 10 if the shaft were driven in this state. In order to avoid this, in one embodiment, the food preparation appliance is equipped so that the food preparation container 2 can be received in a recess, not shown, of the food preparation appliance for operation and the shaft interface 31 can be coupled to the drive unit when the actuation means 24 is connected to the food preparation container 2 in a rotational position, which assures that the locking element 6 is in the locking position.

The locked connection of the tool 1 to the shaft 3 can thus be securely and easily achieved through the axial locking of the tool assembly 11 to the anchoring assembly.

The invention claimed is:

1. A food preparation appliance comprising:
    a food preparation container defining a through passage;
    a rotatable tool disposed within an interior of the food preparation container and configured to rotate about a rotation axis extending through a center of the passage to chop or mix a food inside the food preparation container;
    a shaft arranged to extend through the passage, wherein the shaft is configured to engage the tool inside the food preparation container to drive the tool, and
    a locking mechanism including
        a locking element disposed within the food preparation container and configured to lock the tool to the shaft such that the shaft is engaged to drive the tool and to release the tool from the shaft to disengage the shaft from the tool,
        an actuating element disposed to actuate the locking element via a connecting means to cause the locking element to one of lock the tool to the shaft and release the tool from the shaft, wherein the actuating element and the connecting means interconnect with one another to form an L shape along a plane extending longitudinally relative to the axis of rotation, wherein the connecting means and the locking element interconnect with one another to form an L shape along the plane, wherein the actuating element, the connecting means, and the locking element are sequentially coupled with one another form a U shape along the plane, and wherein at least a portion of the actuating element extends outside the interior of the food preparation container, and
    an anchoring assembly including
        an anchoring element disposed between the locking element and actuating element such that the actuating element and the locking element are movable relative to the anchoring element,
        an anchoring device configured to engage the anchoring element to releasably couple the anchoring element to the food preparation container when a first non-rotationally symmetrical outer contour of the anchoring device engages in a form-fitting rotatable manner a non-rotationally symmetrical inner contour defining the passage of the food preparation container, and
        an anchoring ring, wherein the anchoring device defines at least one slot opening for receiving in an axial form-fitting manner at least a portion of the anchoring ring therewithin, and wherein the anchoring device is configured to releasably couple the anchoring element to the food preparation container when the portion of the anchoring ring is disposed within the at least one slot opening of the anchoring device.

2. The food preparation appliance according to claim 1, wherein the passage is defined within a bottom of the food preparation container, wherein the locking mechanism includes a stop, and wherein the food preparation container is braced or clamped between the stop and the anchoring ring when the anchoring ring has been moved or rotated into the at least one slot opening of the anchoring device.

3. The food preparation appliance according to claim 1, wherein the actuating element is configured to actuate the locking element to move the locking element into one of a locking position to cause the locking element to lock the tool to the shaft and a release position to cause the locking element to release the tool from the shaft.

4. The food preparation appliance according to claim 3, further comprising a tool connecting element positioned such that the shaft engages the tool to drive the tool via the tool connecting element, the locking element is configured to engage detents of the tool connecting element to lock the tool to the shaft in an axially fixed form-fitting manner when the locking element is in the locking position.

5. The food preparation appliance according to claim 4, wherein the detents are disposed about a contour of the tool connecting element.

6. The food preparation appliance according to claim 3, wherein the locking element includes a clamping means configured to apply an axial prestressing force against a body of the locking element.

7. The food preparation appliance according to claim 6, wherein the actuating element is configured to rotate to change the position of the locking element from the release position into the locking position, wherein the clamping means includes a ramp-shaped detent contour, and wherein the ramp-shaped detent contour of the clamping means is configured to engage the actuating element to cause the actuating element to, simultaneously with rotating, slide along the rotation axis in a first direction opposite to a second direction of the prestressing force of the clamping means.

8. The food preparation appliance according to claim 3, wherein the locking mechanism includes an actuation means disposed within a base part, wherein the base part is configured to operatively engage at least a portion of the food preparation container, and wherein the actuation means is configured to engage the actuating element to cause the actuating element to rotatably move the locking element into the locking position to lock the tool to the shaft and rotatably move the locking element out of the locking position and into the release position to unlock the tool from the shaft.

9. An anchoring assembly for anchoring a rotatable tool disposed within a food preparation container of a food preparation appliance, the assembly comprising:
    a shaft sized to extend from outside the food preparation container through a through passage defined within the food preparation container, wherein the passage leads into the inside of the food preparation container, and wherein the shaft is configured to couple to the rotatable tool to drive rotation of the rotatable tool,
    a locking element for locking the tool to the shaft, wherein the locking element is positioned inside the food preparation container, an actuating element for actuating the locking element to lock the tool to the shaft, wherein the actuating element is positioned outside the food preparation container, an anchoring element, and an anchoring device for coupling the anchoring element to the food preparation container in a rotationally coupled and axially fixed manner, wherein the anchoring device is positioned between the actuating element and the locking element along an axis of rotation of the shaft, wherein, for lockably connecting the tool to the shaft, the actuating element and the locking element are coupled to each other by a connecting means that extends inside the passage such that the actuating element and the locking element move together relative to the anchoring element, wherein, along a longitudinal section relative to the axis of rotation, the actuating element forms an L shape with the connecting means, the connecting means forms an L shape with the locking element, and the actuating element, the connecting means and the locking element in this sequence together form a U shape, and wherein the anchoring element has a second non-rotationally symmetrical outer contour adapted for a form-fitting, rotationally coupled fixing of a tool connecting element which comprises a non-rotationally symmetrical inner contour and is adapted to slide onto the second non-rotationally symmetrical outer contour.

10. A food preparation appliance comprising:

a food preparation container defining a through passage;

a rotatable tool disposed within an interior of the food preparation container and configured to rotate about a rotation axis extending through a center of the passage to chop or mix a food inside the food preparation container;

a shaft arranged to extend through the passage, wherein the shaft engages the tool inside the food preparation container to drive the tool; and a locking mechanism including a locking element disposed within the food preparation container and configured to lock the tool to the shaft such that the shaft is engaged to drive the tool and to release the tool from the shaft to disengage the shaft from the tool, an actuating element disposed to actuate the locking element via a connecting means to cause the locking element to one of lock the tool to the shaft and release the tool from the shaft, wherein the actuating element and the connecting means interconnect with one another to form an L shape along a plane extending longitudinally relative to the axis of rotation, wherein the connecting means and the locking element interconnect with one another to form an L shape along the plane, wherein the actuating element, the connecting means, and the locking element are sequentially coupled with one another form a U shape along the plane, and wherein at least a portion of the actuating element extends outside the interior of the food preparation container, and an anchoring assembly including an anchoring element disposed between the locking element and actuating element such that the actuating element and the locking element are movable relative to the anchoring element, and an anchoring device configured to engage the anchoring element to releasably couple the anchoring element to the food preparation container when a first non-rotationally symmetrical outer contour of the anchoring device engages in a form-fitting rotatable manner a non-rotationally symmetrical inner contour defining the passage of the food preparation container, wherein the anchoring element has a second non-rotationally symmetrical outer contour for the form-fitting, rotationally coupled fixing of a tool connecting element, and wherein the tool connecting element comprises a non-rotationally symmetrical inner contour, which is configured such that the tool connecting element is slidable onto the second non-rotationally symmetrical outer contour.

* * * * *